United States Patent
Schneider et al.

(10) Patent No.: US 8,566,790 B2
(45) Date of Patent: *Oct. 22, 2013

(54) INTEGRATION OF EXTERNAL SCHEMAS AND TYPES INTO NATIVE PROGRAMMING LANGUAGES

(75) Inventors: John C. Schneider, Bellevue, WA (US); Terry Leonard Lucas, Snohomish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 293 days.

This patent is subject to a terminal disclaimer.

(21) Appl. No.: 13/093,992

(22) Filed: Apr. 26, 2011
(Under 37 CFR 1.47)

(65) Prior Publication Data
US 2011/0202900 A1 Aug. 18, 2011

Related U.S. Application Data

(63) Continuation of application No. 11/744,152, filed on May 3, 2007, now Pat. No. 7,958,492.

(60) Provisional application No. 60/797,510, filed on May 4, 2006.

(51) Int. Cl.
*G06F 9/44* (2006.01)

(52) U.S. Cl.
USPC ............................ 717/116; 717/108; 717/114

(58) Field of Classification Search
USPC ................................................. 717/108–116
See application file for complete search history.

(56) References Cited

U.S. PATENT DOCUMENTS

| | | | |
|---|---|---|---|
| 6,553,563 B2 * | 4/2003 | Ambrose et al. | 717/116 |
| 6,609,130 B1 * | 8/2003 | Saulpaugh et al. | 717/116 |
| 6,754,884 B1 * | 6/2004 | Lucas et al. | 717/108 |
| 6,763,343 B1 * | 7/2004 | Brooke et al. | 717/115 |
| 6,859,920 B1 | 2/2005 | Finocchio | |
| 6,889,359 B1 * | 5/2005 | Conner et al. | 715/207 |
| 7,092,955 B2 | 8/2006 | Mah et al. | |
| 7,127,704 B2 * | 10/2006 | Van De Vanter et al. | 717/112 |
| 7,165,239 B2 | 1/2007 | Hejlsberg et al. | |
| 7,171,648 B1 | 1/2007 | Finocchio | |
| 7,194,729 B2 * | 3/2007 | Stone et al. | 717/108 |
| 7,237,225 B2 | 6/2007 | Kompalli et al. | |
| 7,380,236 B2 | 5/2008 | Hawley | |
| 7,412,685 B2 * | 8/2008 | Miller et al. | 717/101 |
| 7,475,384 B2 * | 1/2009 | Heath et al. | 717/114 |
| 7,480,894 B2 | 1/2009 | Hasson et al. | |
| 7,490,316 B2 | 2/2009 | Chan et al. | |
| 7,496,892 B2 * | 2/2009 | Nuss | 717/114 |
| 7,536,673 B2 | 5/2009 | Brendle et al. | |

(Continued)

OTHER PUBLICATIONS

Li et al, "NaLIX: an Interactive Natural Language Interface for Querying XML", ACM, pp. 900-902, 2005.*

(Continued)

*Primary Examiner* — Anil Khatri
(74) *Attorney, Agent, or Firm* — Miles & Stockbridge P.C.

(57) ABSTRACT

A system includes a processor, a storage medium, an extensible markup language (XML) schema stored on the storage medium, and a script for manipulating an XML document stored on the storage medium. The script includes an import function to import the XML schema such that the definitions of the XML schema are used to interpret the script.

25 Claims, 4 Drawing Sheets

(56) References Cited

U.S. PATENT DOCUMENTS

| | | | |
|---|---|---|---|
| 7,539,973 | B2 | 5/2009 | Hodge |
| 7,539,982 | B2 * | 5/2009 | Stuart .......................... 717/140 |
| 7,546,602 | B2 | 6/2009 | Hejlsberg et al. |
| 7,552,418 | B2 * | 6/2009 | Saad et al. .................... 717/100 |
| 7,574,692 | B2 * | 8/2009 | Herscu ......................... 717/116 |
| 7,590,980 | B1 | 9/2009 | Clubb et al. |
| 7,607,121 | B2 | 10/2009 | Chow et al. |
| 7,620,936 | B2 * | 11/2009 | Ernst et al. ................... 717/108 |
| 7,627,854 | B2 * | 12/2009 | Burner et al. ................. 717/115 |
| 7,627,861 | B2 | 12/2009 | Smith |
| 7,774,376 | B1 | 8/2010 | Meijer et al. |
| 7,827,210 | B2 | 11/2010 | Meliksetian et al. |
| 7,895,563 | B2 * | 2/2011 | Carlson et al. ............... 717/102 |
| 7,895,570 | B2 * | 2/2011 | Gibson et al. ................ 717/115 |
| 7,958,492 | B2 * | 6/2011 | Schneider et al. ............ 717/116 |
| 8,086,998 | B2 * | 12/2011 | Bansal et al. ................. 717/108 |
| 8,196,112 | B1 * | 6/2012 | Cansizlar ...................... 717/126 |
| 8,239,820 | B1 * | 8/2012 | White et al. .................. 717/101 |
| 8,271,943 | B2 * | 9/2012 | Hudson, III ................... 717/113 |
| 8,296,730 | B2 * | 10/2012 | Whitechapel et al. ........ 717/116 |

OTHER PUBLICATIONS

Seyfer et al, "Capture Fields Modularity in a Stream-Relational Event Processing Langauge" ACM, pp. 15-21, 2011.*

Lawrence et al, "Integrating Relational Database Schemas using a Standardized Dictionary", ACM, pp. 225-230, 2001.*

Checiu et al, "A New Algorithm for Mapping XML Schema to XML Schema", IEEE, pp. 625-630, 2010.*

Chung et al., "Modeling web applications using Java and XML related technologies", IEEE HICSS, pp. 1-10, 2003.

Macek et al., "An extension of business process model for XML schema modeling", IEEE, pp. 383-390, 2010.

Checiu et al., "A new algorithm for mapping XML schema to XML schema", IEEE, pp. 625-630, 2010.

Bamford et al., "Xquery Reloaded", ACM VLBD, pp. 1342-1353, 2009.

Marinelli et al., "SchemaPath a minimal extension to XML schema for conditional constraints", ACM WWW, pp. 164-174, 2004.

Su et al., "Automating the transformation of XML documents", ACM WIDM, pp. 68-75, 2001.

* cited by examiner

```
// import the XML types associated with the inventory
import inventory.xsd;

// Declare an object for holding XML inventory documents
var inv : inventory;

// read an XML inventory document from file
inv = new inventory(readFile("inventory.xml"));

// Add the cost of a few parts
// NOTE: The schema information tells us that each part price is a floating point number, so the "+" operator
// should do arithmetic addition instead of string concatenation
var componentCost = inv.part[1].price + inv.part[2].price + inv.part[3].price;

// change the price of an item
// NOTE: The integer 35 will be automatically coerced to the floating point value 35.00 due to schema info.
inv.part[1].price = 35;

// try to add an illegal property. This error could be flagged at compile time or run-time using schema info
inv.part[1].color = "Blue";          // ERROR!: parts are not allowed to have colors // anything can be added to the untyped "annotation" section
inv.part[1].annotation.color = "Blue";   // OK: the annotation can hold "anyType"

// add an illegal part number
inv.part[1].partno = "1-AB-234";     // INVALID!: part numbers must follow the AAA-NNNN pattern // add an out-of-range stock number
inv.part[1].instock = 999999;        // INVALID!: instock quantities must be in the range 0-999

// use validate method to detect data constraints that are violated
if (inv.part[1].validate() != true)
        print("part[1] is not valid!");

// use the keyref dereference operator to find out which part the crank shaft belongs to:
var shaftBelongsTo = inv.part[2]->partof.name;

// use the keyref dereference operator to find the total price of all parts required by the crank assembly
var totalComponentPrice = 0;
for each (part in inv.part[0]->requires)
        totalComponentPrice += part.price;
```

Figure 2

```xml
<?xml version="1.0" ?>
<ns:inventory xmlns:ns="http://www.example.com/inventory">
<part partno="XYZ-6789">
<name>Crank assembly</name>
<instock>4</instock>
<onorder>1</onorder>
<price>85.00</price>
<cost>60.00</cost>
<requires>AAA-1234 BBB-2345 CCC-3456</requires>
<annotations>
<note>includes grease, tools, required parts and assembly instructions</note>
</annotations>
</part>
<part partno="AAA-1234">
<name>Crank arms (2)</name>
<instock>8</instock>
<onorder>0</onorder>
<price>39.00</price>
<cost>25.00</cost>
<partof>XYZ-6789</partof>
<annotations>
<note>May be bundled with crank assembly or sold separately</note>
</annotations>
</part>
<part partno="BBB-2345">
<name>Crank shaft</name>
<instock>6</instock>
<onorder>2</onorder>
<price>42.00</price>
<cost>30.00</cost>
<partof>XYZ-6789</partof>
<annotations>
<note>May be bundled with crank assembly or sold separately</note>
</annotations>
</part>
<part partno="CCC-3456">
<name>Bearings</name>
<instock>25</instock>
<onorder>4</onorder>
<price>8.00</price>
<cost>4.00</cost>
<partof>XYZ-6789</partof>
</part>
</ns:inventory>
```

Figure 3

```xml
<?xml version="1.0" ?>
<xs:schema targetNamespace="http://www.example.com/inventory"
    xmlns:xs="http://www.w3.org/2001/XMLSchema"
    xmlns:ns="http://www.example.com/inventory">

<!-- An inventory is a collection of parts -->
        <xs:element name="inventory">
                <xs:complexType>
                        <xs:sequence maxOccurs="unbounded">
                                <xs:element name="part" type="ns:partType" />
                        </xs:sequence>
                </xs:complexType>

<!-- part numbers are used as unique keys to identify parts -->
                <xs:key name="pNumKey">
                        <xs:selector xpath="ns:part" />
                        <xs:field xpath="@partno" />
                </xs:key>

<!-- the "partof" element refers to another part of which this part is a sub-component -->
                <xs:keyref name="partofref" refer="ns:pNumKey">
                        <xs:selector xpath="ns:part" />
                        <xs:field xpath="ns:partof" />
                </xs:keyref>

<!-- "requires" element refers to a set of other parts this part requires -->
                <xs:keyref name="requiresref" refer="ns:pNumKey">
                        <xs:selector xpath="ns:part" />
                        <xs:field xpath="ns:requires" />
                </xs:keyref>

</xs:element>

<!-- each part contains a name, price, etc. -->
        <xs:complexType name="partType">
                <xs:sequence>
                        <xs:element name="name" type="xs:string" />
                        <xs:element name="instock" type="ns:quantityType" />
                        <xs:element name="onorder" type="ns:quantityType" />
                        <xs:element name="price" type="xs:float" />
                        <xs:element name="cost" type="xs:float" />
                        <xs:element name="requires" type="ns:partIdListType" minOccurs="0"/>
                        <xs:element name="partof" type="ns:partIdType" minOccurs="0"/>
                        <xs:element name="annotations" type="xs:anyType" minOccurs="0"/>
                </xs:sequence>
                <xs:attribute name="partno" type="ns:partIdType" />
        </xs:complexType>

<xs:simpleType name="quantityType">
                <xs:restriction base="xs:int">
                        <xs:minInclusive value="0"/>
                        <xs:maxInclusive value="999"/>
                </xs:restriction>
        </xs:simpleType>

<xs:simpleType name="partIdType">
                <xs:restriction base="xs:string">
                        <xs:pattern value="[A-Z]{3}-[0-9]{4}"/>
                </xs:restriction>
        </xs:simpleType>

<xs:simpleType name="partIdListType">
                <xs:list itemType="ns:partIdType" />
        </xs:simpleType>
</xs:schema>
```

Figure 4

INTEGRATION OF EXTERNAL SCHEMAS AND TYPES INTO NATIVE PROGRAMMING LANGUAGES

CLAIM OF PRIORITY

This application claims priority from the following application, which is hereby incorporated in its entirety:

U.S. Non-Provisional application Ser. No. 11/744,152, entitled INTEGRATION OF EXTERNAL SCHEMAS AND TYPES INTO NATIVE PROGRAMMING LANGUAGES, filed May 3, 2007, which claims priority from the following provisional application, which is also hereby incorporated in its entirety, U.S. Provisional Application No. 60/797,510 entitled INTEGRATION OF EXTERNAL SCHEMA AND TYPES INTO NATIVE PROGRAMMING LANGUAGES, filed by John C. Schneider, filed May 4, 2006 (Attorney Docket No. BEAS-1957USO).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention relates to the field of programming languages.

BACKGROUND

XML is rapidly emerging as the de-facto standard for transmitting data structures between software applications and web services. While most software applications and web services are written in modem programming languages, such as JAVA® programming language or C++, none of these programming languages provide native support for representing and manipulating XML. Consequently, programmers are forced to develop or adopt external software packages for representing and manipulating XML within the context of their applications and web services.(JAVA® is a registered trademark of Oracle Corporation).

In general, external software packages are not capable of providing the host language with native support for processing XML data. As such, they represent and manipulate XML in ways that are quite different than those provided by the host language for its native data types. Most often, external software packages represent XML data using a general purpose tree abstraction and provide a tree-based application programming interface (API) for navigating and manipulating the data (e.g., getParentNodeO, getChildNodesO, removeChildO, etc.). Additionally, there are different processing models such as DOM, XSLT, XQuery, etc that can introduce a steep learning curve for the developer community as these models require specialized knowledge and cumbersome concepts of trees, nodes, recursive decent, etc. This method of accessing and manipulating data structures is cumbersome and time consuming compared to methods used for accessing and manipulating data structures native to the host programming language.

Therefore, a programming language that enables the integration and manipulation thereafter of external schema and types of data representation language such as XML with the same power and flexibility afforded by native data structures is desirable. This is particularly useful for untyped native programming or scripting languages. This enables programmers and web developers to use the power of XML structured data, allowing them to leverage their existing skills, and reuse familiar programming concepts (operators and syntax). By allowing the facility to manipulate and use external schema and types in the native language reduces code complexity, time to market, cost of development and testing, and decreases code footprint requirements.

BRIEF DESCRIPTION OF THE DRAWINGS

FIG. 2 is a diagram of a script of one embodiment.

FIG. 3 is a diagram of an XML document accessed by the script of FIG. 2.

FIG. 4 is a diagram of an XML schema used by the script of FIG. 2.

DETAILED DESCRIPTION

Figure 1:
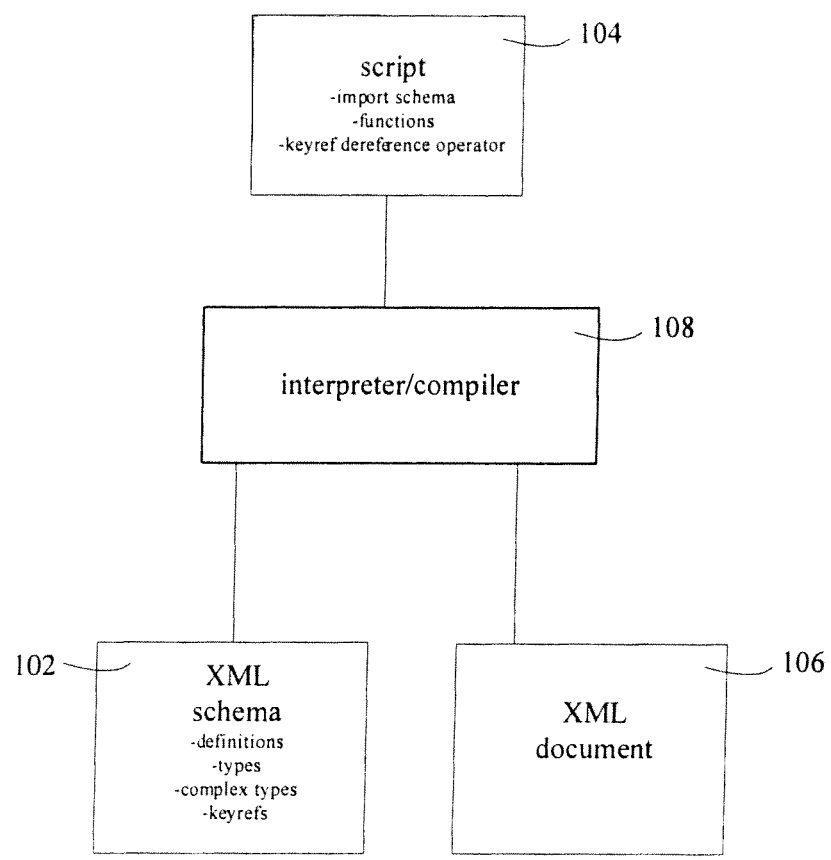
FIG. 1 is a diagram that shows an embodiment of the present invention.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Concepts and terminology commonly used by those familiar with compiler and parser design are used herein. Those who are unfamiliar with the inner workings of compilers and parsers are referred to "Compilers: Principals, Techniques and Tools" by A. Aho, R. Sethi and J. Ullman published by Addison Wesley Publishing Company in November 1985 (ISBN 0201100886). In addition, basic familiarity by the reader with XML concepts and terminology, including XML, XML Schema, the Document Object Model (DOM), the XML Query Language and XPath is assumed. Those unfamiliar with these technologies are referred to the following World Wide Web Consortium (W3C) publications: Extensible Markup Language (XML) 1.0 (Second Edition), W3C Recommendation REC-XML-20001006, 6 Oct. 2000; Document Object Model (DOM) Level 1 Specification, W3C Recommendation REC-DOM-Level-1-19981001, 1 Oct. 1998; XQuery 1.0: An XML Query Language, W3C Working Draft WDXQUERY-20021220, 20 Dec. 2001; XML Path Language (XPath), W3C Recommendation REC-XPATH-19991116, 16 Nov. 1999; XML Schema Part 0: Primer, W3C Recommendation REC-XMLSCHEMA-0-20010502, 2 May 2001; XML Schema Part 1: Structures, W3C Recommendation REC-XMLSCHEMA-1-20010502, 2 May 2001; and XML Schema Part 2: Datatypes, W3C Recommendation REC-XMLSCHEMA-2-20010502, 2 May 2001.

Parts of the description will be presented in terms of operations performed by a processor based device, using terms such as receiving, analyzing, determining, generating, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, microcontrollers, digital signal processors, and the like, that are standalone, adjunct or embedded.

Various operations will be described as multiple discrete steps in turn, in a manner that is most helpful in understanding the present invention; however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Overview

FIG. 1 shows an embodiment of one invention. The interpreter/compiler 108 can be used to view the script 104. The script 104 can be used to manipulate the XML document 106. A scripting language used in one embodiment my be an extension of E4X which is an type of ECMA script. The XML schema 102 can be used to help define the XML document 106. In the past scripts have not been able to use the XML Schemas to define types for scripts.

FIG. 1 shows a system comprising an XML schema 102; and a script 104 for manipulating Xml document 106. The script includes an import function to import the XML schema such that the definitions of the XML schema 102 are used to interpret the script 104.

A type definition of the XML schema can be used to interpret the script. At least one of the type definitions can be a complex type definition. Functions in the script can interpret data according to the type definition in the XML schema 102. The script can include a validate method to check if an XML schema data constraint is violated. The script can use a keyref dereference operator to use a keyref defined in the XML schema to get data. The system can coerce data into a type defined in the XML schema.

An interpreter 108 can be used to evaluate the script. In one embodiment, interpreter 108 can execute a script 104 in accordance with a scripting language. The scripting language can include an import function to import an XML schema such that the definitions of the XML schema 102 are used to interpret the script 104.

In one embodiment, computer executable method comprises importing an XML schema for a script. The script allowing the manipulation of an Xml document and using definitions of the XML schema to interpret the script.

The present invention can include the provision of functional descriptions of methods that help integrate external Schema and Types into the native programming language. More specifically, in accordance with one embodiment of the invention, by integrating native XML Schema and Type into a given programming language such as ECMAScript, XML-based member functions for performing common operations within native programming and/or scripting language can be made available. Additionally, embodiments of the present invention can extend current Types by use of constraints on structure and also the ability to mix constrained and unconstrained Types into a common structure. The external data source can be any programming language or database. Accordingly, the present invention can provide a mechanism to integrate and manipulate both external and native objects, which is particularly suited for the increasingly universal problem of mapping external objects into and out of software applications and web services written in modem programming languages.

The present inventions will be described by way of exemplary embodiments, but not limitations, illustrated in the accompany software code and/or drawings. Embodiments of the present invention can include a method for associating external Type system in the native programming language such that programmer can take advantage of the Type representation of an external programming language or database into the host programming language using familiar (to the host programming language) programming concepts and without major effort or learning exercise. Thus a new Type system is introduced by importing a new schema and Type system into the host programming language.

In addition, embodiments of the present invention can use a method to expand and extend the native Type system with the help of constraints on structure.

In addition, embodiments of the present invention can use a method for allowing coercion of Types so that the programming language can perform operations on values of different types without the compiler/interpreter raising an exception. Instead the compiler/interpreter can automatically change (coerce) one of the data types to that of the other before performing the operation. In one embodiment, the compiler/interpreter can allow all coercions unless it can prove that the coercion will always fail. Any coercion that may fail can generate a warning at compiler time, and many produce a runtime error if the coercion fails.

In addition, the embodiments can use a method to use Type information to change semantics and a method of mixing constrained and unconstrained Types in a common structure to dynamically include anything.

In addition, embodiments of the present invention include a method to include external Types and Schemas into the native language editors and IDEs to provide assistance to the programmer by offering features such as name completion and property lists.

As discussed above, conventional programming languages do not provide sufficient functionality when it comes to interoperability and integration between XML documents and programming language objects. Therefore, in accordance with the teachings of the present invention, XML-oriented schema and document for use in association with a programming language such as JAVA® programming language, C++, ECMAScript, and so forth, are provided and will now be described. To avoid confusion, the following examples are described in relation to ECMAScript; however, the applicability of the present invention should not be read as being limited solely to ECMAScript.

The inventions are discussed below with the help of illustrations in accordance to one embodiment of the invention. FIG. 4 is an exemplary XML Schema to describe an inventory that consists of various parts. Here our hypothetical schema is residing on example.com server, and the file is called inventory.xsd. It is in its first version. The default namespace declaration is the schema reference to XML Schemas: Structures and this is a closed model schema, which means that all documents conforming to this schema will be completely defined by the schema and must not have any outside content. Next, <element/> element is used to declare inventory element. Inventory is defined as a complexType element meaning that it contains other elements and/or attributes. The constraint on its occurrence (meaning maximum number of times that an element may appear in a content model) as defined by the term unbounded indicates that there is no maximum number of occurrences for this element. The key name indicates that some field of the schema contains a key value. The key value must be unique and may not be nullable. The part of element refers to another part of which this part is a subcomponent. The requires element refers to a set of other parts this part requires. Then, the schema defines elements for part with the constraint that the element information items match the items in sequential order. Some of the part elements have constraints as defined by dataType quantityType and partIdType. The annotations element can have any dataType as indicated by anyType dataType.

FIG. 3 is an example XML document representing some parts in an inventory. This XML document uses the schema as represented in FIG. 4. Each part has a part number. One of the parts—the crank assembly is made up of other parts. The <requires> element can be used to express this relationship between parts. Likewise, some of the components of the assembly crank arms, crank shaft, and bearings can use the <partof> element to indicate they can be used as part of a larger assembly.

FIG. 2 illustrates an example script that imports the schema (FIG. 1). An XML Schema may be used to declare specific types of XML values for use within the programming language. This is accomplished using "import" statement. Importing a Schema is similar to importing an external class. Just as a class file describes a class of objects, an XML Schema file describes a class of Xml documents.

Importing an XML Schema file can create a collection of new types for manipulating XML values conforming to the XML types defined in the schema file. Each of these types can be a restricted form of the general XML type. The nature and extent of these restrictions can be defined by the XML Schema language. The programming language compiler interpreter can enforce these restrictions through a combination of compile-time and run-time checks for each operation. Importing the schema inventory.xsd can create a new XML type called inventory. This is done by declaring an object inv that holds inventory document. Then, we read an XML inventory document from file such as inventory.xml (FIG. 3). At this point the new Type can be created and initialized with appropriate values. The type can be further expanded by the user of constraints defined in the schema to form complex types. For example, value of instock and onorder elements of each part can be constrained to be between 0 and 999 and partIDType element is constrained by the format "[A-Z]{3}-[O-9]{4}" or AAA-1111 format where AAA is any alphabet string and 1111 can be any number between 0 and 9999. Another example would be specifying a date format for example; a date could be represented as date-month-year or month-date-year by specifying the constraints as "dd-dd-dddd". Yet another example would be specifying the pattern constraint for a telephone number for e.g. nnn-nnn-nnn-nnnn (country code-area code-npa-nxxx). Other types of constraints could be defining the element a string or float. This Type constraint could be one or many of any of the Types defined in the external programming language irrespective of whether they are defined in the native language or not. This way the native language is incorporating the feature, functionality, and semantics of the external programming language while using the programming concepts of the native programming language. Thus it is able to introduce new Type systems as well as extend current Type system and data representations.

If the value of these elements is changed to a value that doesn't follow the pattern or is not within the defined schema constraints then the error can be caught at compile time or by using a builtin function. This feature may be implemented by augmenting the compiler or interpreter with calls to well known validation algorithms for each type of schema constraint. For example, in FIG. 2, the addition of an illegal property "color" can be flagged at compile time (or run-time) using the schema information which doesn't define the element color. Similarly, in FIG. 2, attribute partno doesn't follow the [A-Z]{3}-[0-9]{4} format described in the schema, so can be flagged as an error. In an another example as depicted in FIG. 2, since element instock can only take values between 0-999, the declared value of 999999 can be flagged as an error. To avoid unnecessary runtime inefficiencies, runtime validation can be deferred until the developer explicitly requests it using the built-in validate ( ) method. The validate method can detect at run-time if any data constraints of the element have been violated as shown in FIG. 2.

In addition, the present invention introduces a method for allowing coercion of Types so that the programming language can perform operations on values of different types without the compiler raising an exception. Instead the compiler automatically changes (coerces) one of the data types to that of the other before performing the operation. The compiler allows all coercions unless it can prove that the coercion will always fail. Any coercion that may fail generates a warning at compiler time, and many produce a runtime error if the coercion fails. For example, in FIG. 2, since schema describes each part price as a floating point number, "+" operator does the arithmetic addition instead of string concatenation. Similarly, in FIG. 2 the integer 35 is automatically coerced to the floating point value 35.00 due to schema information.

FIG. 2 provides an example of unconstrained Type where in the annotations element can have any value of anyType, so it could be a string or a number. This ability to combine constrained and unconstrained Types into a common structure affords flexibility to the programmer and reduces the complexity and code required to accomplish a given task.

FIG. 2 also shows a keyref dereference operator, in this case as denoted by "->", which can be used to search and filter (that in turn facilitates other operations) efficiently across the elements of the external programming language from the native programming language. One can use the dereference operator to issue queries that would otherwise would have more complex implementation. In FIG. 2, keyref dereference operator "->" is used to find out which part the crank shaft belongs to and to find the total price of all parts required by crank assembly.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROM's, EEPROM's, DRAMs, flash memory devices, magnetic or optical cards, Nan systems (including molecular memory ICs), or any type of media or device suitable for storing instructions and/or data.

Stored on anyone of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A system comprising:
    a processor;
    a storage medium;
    a data representation language schema stored on the storage medium; and
    a script for manipulating a data representation language document in accordance with a scripting language stored on the storage medium; and an interpreter to evaluate the script,
    wherein the processor is configured to import the data representation language schema using an import function of the script;
    wherein the processor is further configured to create one or more new types within the scripting language for manipulating data representation language values conforming to one or more type definitions within the data representation language schema; and
    wherein the processor is further configured to interpret the script using the one or more new types.

2. The system of claim 1, wherein a type definition of the data representation language schema is used to interpret the script.

3. The system of claim 2, wherein at least one of the type definitions is a complex type definition.

4. The system of claim 2, wherein a function in the script interprets data according to the type definition in the data representation language schema.

5. The system of claim 1, wherein the script includes a validate method to check if a data representation language schema data constraint is violated.

6. The system of claim 1, wherein the system coerces data into a type defined in the data representation language schema.

7. The system of claim 1, wherein the script uses a keyref dereference operator to use a keyref defined in the data representation language schema to get data.

8. A device, comprising:
    a processor;
    a storage medium; and
    an interpreter configured to execute a script in accordance with a scripting language stored on the storage medium,
    wherein the interpreter is configured, when executed by the processor, to import a data representation language schema using an import function of the scripting language;
    wherein the interpreter is further configured, when executed by the processor, to create one or more new types within the scripting language for manipulating data representation language values conforming to one or more type definitions within the data representation language schema; and
    wherein the interpreter is further configured, when executed by the processor, to interpret the script using the one or more new types.

9. The device of claim 8, wherein a type definition of the data representation language schema is used to interpret the script.

10. The device of claim 9, wherein at least one of the type definitions is a complex type definition.

11. The device of claim 9, wherein a function in the script interprets data according to the type definition in the data representation language schema.

12. The device of claim 8, wherein the script includes a validate method to check if a data representation language schema data constraint is violated.

13. The device of claim 8, wherein the device coerces data into a type defined in the data representation language schema.

14. A computer executable method comprising:
    importing, by a processor, a data representation language schema for a script, the script allowing the manipulation of a data representation language document in accordance with a scripting language; and
    creating, by the processor, one or more new types within the scripting language for manipulating data representation language values conforming to one or more type definitions within the data representation language schema; and
    interpreting, by the processor, the script using the one or more new types.

15. The computer executable method of claim 14, wherein a type definition of the data representation language schema is used to interpret the script.

16. The computer executable method of claim 15, wherein at least one of the type definitions is a complex type definition.

17. The computer executable method of claim 15, wherein a function in the script interprets data according to the type definition in the data representation language schema.

18. The computer executable method of claim 14, wherein the script includes a validate method to check if a data representation language schema data constraint is violated.

19. The computer executable method of claim 14, further comprising coercing data into a type defined in the data representation language schema.

20. A non-transitory computer-readable medium having instructions stored thereon that, when executed by a processor, cause the processor to perform a method, the method comprising:
    importing a data representation language schema for a script, the script allowing the manipulation of a data representation language document in accordance with a scripting language; and
    creating one or more new types within the scripting language for manipulating data representation language values conforming to one or more type definitions within the data representation language schema; and
    interpreting the script using the one or more new types.

21. The non-transitory computer-readable medium of claim 20, wherein a type definition of the data representation language schema is used to interpret the script.

22. The non-transitory computer-readable medium of claim 21, wherein at least one of the type definitions is a complex type definition.

23. The non-transitory computer-readable medium of claim 21, wherein a function in the script interprets data according to the type definition in the data representation language schema.

24. The non-transitory computer-readable medium of claim 20, wherein the script includes a validate method to check if a data representation language schema data constraint is violated.

25. The non-transitory computer-readable medium of claim 20, the method further comprising coercing data into a type defined in the data representation language schema.

* * * * *

UNITED STATES PATENT AND TRADEMARK OFFICE
CERTIFICATE OF CORRECTION

PATENT NO. : 8,566,790 B2
APPLICATION NO. : 13/093992
DATED : October 22, 2013
INVENTOR(S) : Schneider et al.

It is certified that error appears in the above-identified patent and that said Letters Patent is hereby corrected as shown below:

On the Title Page

On page 2, column 2, item [56] under "Other Publications", line 2, delete "Langauge"" and insert -- Language" --, therefor.

In the Specification

Column 3, line 28, delete "my" and insert -- may --, therefor.

Signed and Sealed this
Third Day of June, 2014

Michelle K. Lee
*Deputy Director of the United States Patent and Trademark Office*